June 28, 1932.   1,864,519
J. D. BOULARAN, OTHERWISE KNOWN AS J. DEVAL ET AL
APPARATUS FOR SYNCHRONOUS CINEMATOGRAPHIC
PROJECTION AND PHONOGRAPHIC AUDITION
Filed Jan. 29, 1930   2 Sheets-Sheet 1
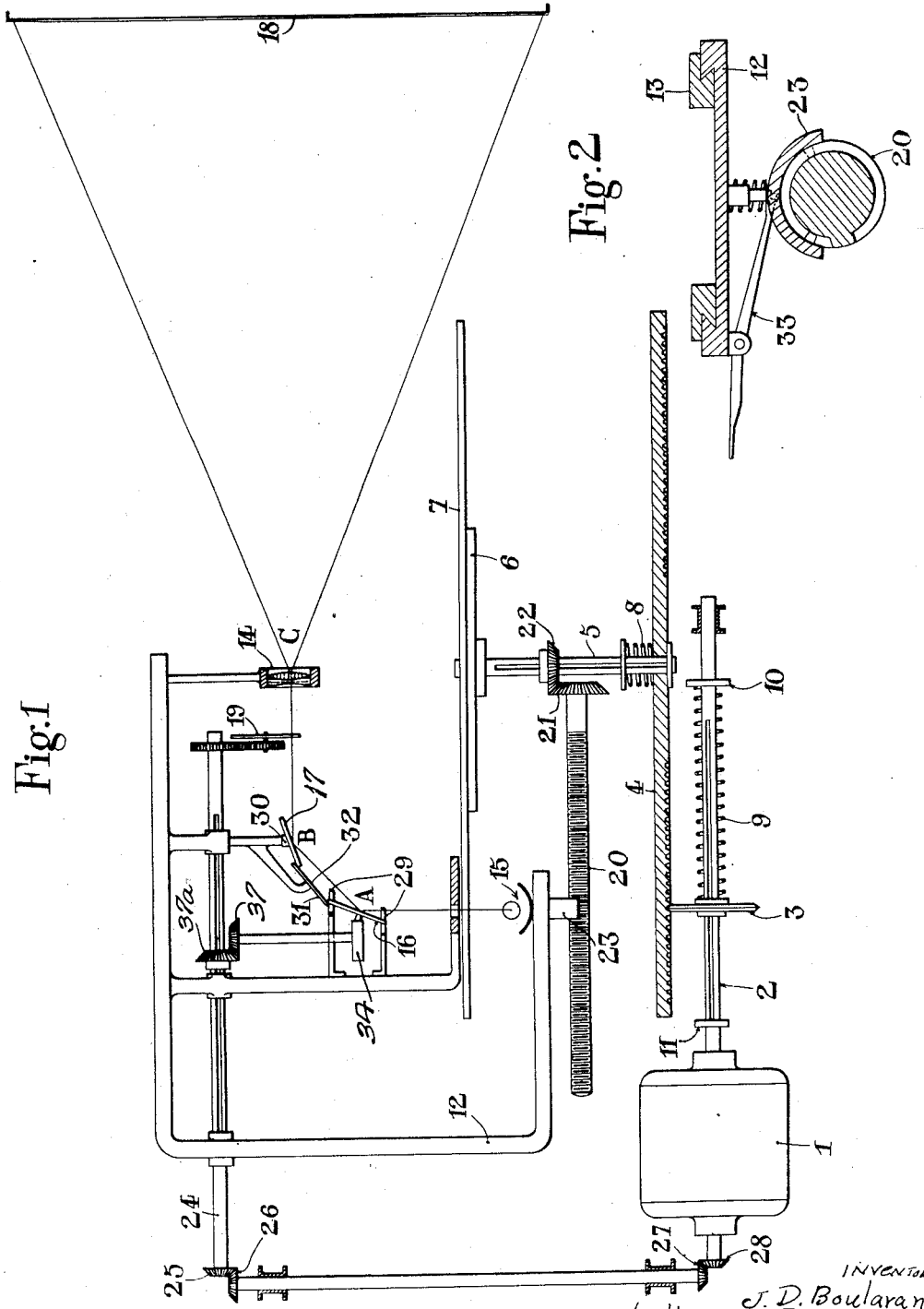

June 28, 1932.  1,864,519
J. D. BOULARAN, OTHERWISE KNOWN AS J. DEVAL ET AL
APPARATUS FOR SYNCHRONOUS CINEMATOGRAPHIC
PROJECTION AND PHONOGRAPHIC AUDITION
Filed Jan. 29, 1930  2 Sheets-Sheet 2
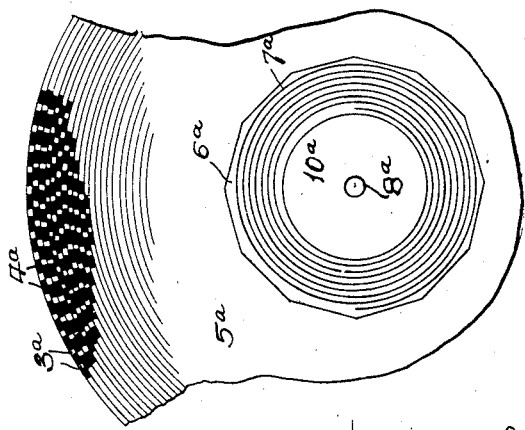
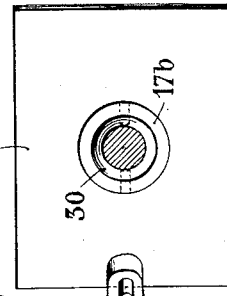
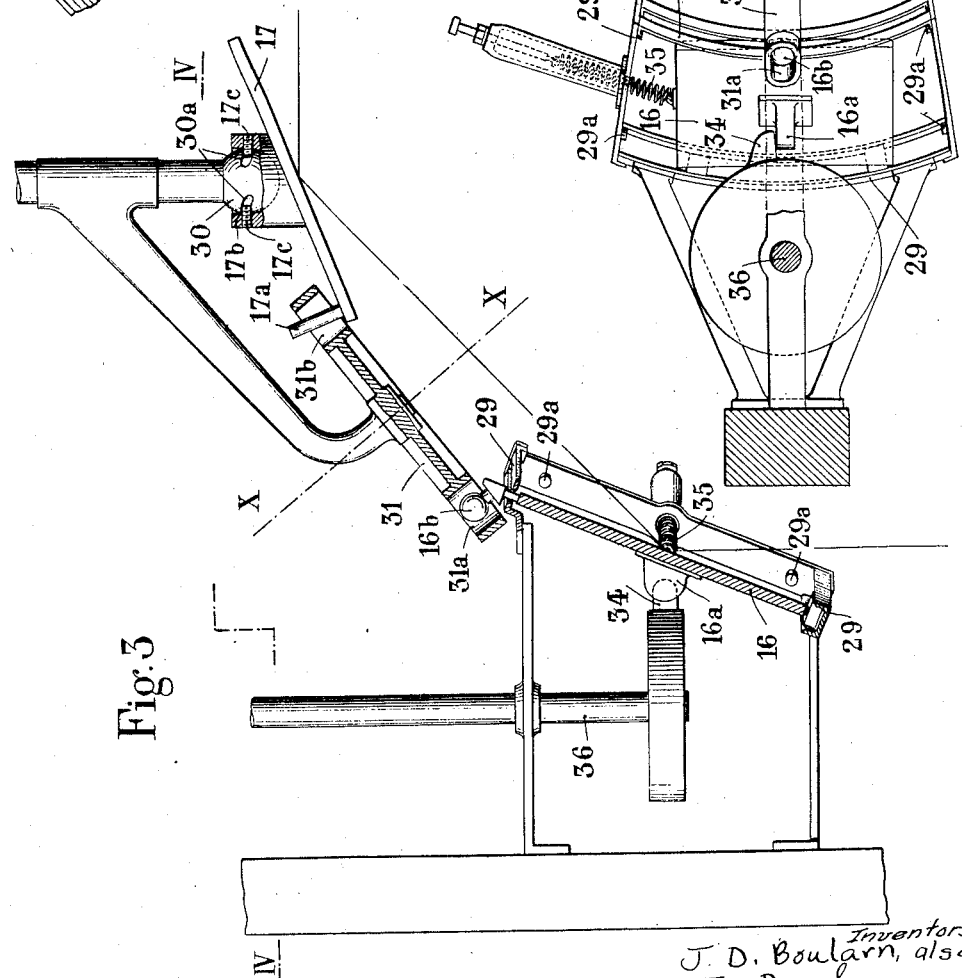
Inventors.
J. D. Boularn, also
known as J. Deval
and
P. A. Digeon
By: Marks + Clerk
attys Patented June 28, 1932

1,864,519

UNITED STATES PATENT OFFICE

JACQUES DABERT BOULARAN, OTHERWISE KNOWN AS JACQUES DEVAL, AND PIERRE ARMAND DIGEON, OF PARIS, FRANCE

APPARATUS FOR SYNCHRONOUS CINEMATOGRAPHIC PROJECTION AND PHONOGRAPHIC AUDITION

Application filed January 29, 1930, Serial No. 424,409, and in France November 20, 1929.

The present invention has for its object an apparatus serving for cinematographic projection with synchronous phonographic audition, and more particularly devised so that it can be constructed in a simple, compact, and economical manner, and that it can be used by anybody, at home, even in a lighted hall.

This apparatus is devised for utilizing a record forming the subject-matter of the application Ser. No. 424,410 filed Jan. 29, 1930 and having two concentric portions, one of which is transparent and bears a series of images arranged according to a spiral, and the other has a phonographic groove also of spiral shape, both spirals having the same number of turns.

In accordance with the invention, this record is horizontally arranged on a rotating support and its transparent images are successively traversed by a vertical light beam, which is subsequently horizontally reflected for passing through a projection objective. This reflection is produced by means of one or more mirrors or prisms which receive an oscillatory movement upon passage of each image in order to compensate the displacement of the latter and to ensure the fixity of the projection. At the same time a phonographic reproducer of any type, connected to an acoustic horn, rests on the portion of the record forming a phonogram and produces the sounds which correspond at every instant to the projected image.

The record is driven from a motor having a constant speed of rotation, through the medium of a mechanism adapted to progressively modify the ratio of transmission as the record rotates, so that the linear speed of the various points of each spiral remains constant notwithstanding the variation of the radius of this curve.

A form of construction of an apparatus in accordance with the invention is illustrated, by way of example, in the accompanying drawings, in which:

Fig. 1 is a diagram of the entire apparatus shown in vertical section.

Fig. 2 shows details of a device serving to displace the whole of the optical system during the projection.

Fig. 3 is a vertical section on a larger scale, of part of the mechanism as shown in Fig. 1.

Fig. 4 is an horizontal section according to line IV—IV of Fig. 3.

Fig. 5 is a plan view of a portion of the record carrying the images and the phonographic groove.

1 designates an electric motor having a constant speed and actuating, with suitable speed reduction, a horizontal shaft 2. On a fluted portion of this shaft slides a roller 3 which serves to frictionally drive a plate 4 mounted on a vertical shaft 5. The latter carries another plate 6 on which is secured the record 7, the peripheral transparent portion of which bears the images arranged according to a spiral, and the central portion is provided with the phonographic groove.

As described in patent application Ser. No. 424,410, the transparent part carrying the images 3a can consist in a layer of gelatin covered with a glass ring 5a surrounding a disc 6a which carries the groove 7a these two parts being so assembled that they cannot rotate relatively to each other, for instance with a polygonal fit. The disc 6a is perforated with a central hole and fits upon the screw-threaded end 8a of the shaft 5 and the compound disc 5a, 6a is fastened on the plate 6 by a washer 10a which is screwed on the end 8a.

The images 3a are separated from each other by opaque portions 4a, the length of which is slightly greater than that of the images, because the periods of passage of the light rays during the active working movements of the rocking optical system, which will be described later on, are separated by periods at least as long as those corresponding to the stoppages and to the return movements of this optical system.

The plate 4 is slidably mounted on the shaft 5 and pressed downwardly by a spring 8, so that it resiliently rests on the roller 3. In the lower face of this plate is formed a groove in the form of a spiral in which engages the edge of the roller, this spiral groove having as many turns as the cinematographic spiral and as spiral of the phonogram. It results therefrom that the roller 3 is compelled to progressively move towards the center of the plate 4 and impacts to the same a progressively increasing angular speed. By thus moving, the roller compresses a light spring 9 placed on the shaft 2 and bearing against the ball abutment 10. When the audition is finished, the plate 4 is slightly lifted and the roller 3 is then brought back by the expansion of the spring to its starting position against an abutment 11.

The optical part of the apparatus is carried by a movable frame 12, sliding on horizontal slides 13 parallel to the optical axis of the objective 14.

On this frame are mounted, on the one hand, a source of light 15 with a reflector, this source of light being arranged under the record 7, and, on the other hand, a set of mirrors 16 and 17 serving to successively reflect the cinematographic images in the direction of the objective 14.

In order to ensure the fixity of the projection on the screen 18, it is advisable to impart to the mirrors 16, 17, upon passage of each of the images above the source of light, an oscillatory movement adapted to compensate the displacement of the cinematographic image during the time of its projection. In the interval of time separating the projections of two images, the mirrors rock in reverse direction for coming back to their initial position, and the light beam is then stopped by the opaque portions separating the cinematographic images on the record 7. The glare can, if necessary be eliminated by the use of a shutter 19 rotating in synchronism with the passage of the images.

For moving the optical system, a screw-threaded horizontal shaft 20 is provided, which shaft is coupled by bevel pinions 21, 22, with the shaft 5, and a half-nut 23 mounted under the frame 12 and gearing with the helical thread of this shaft 20. The pitch of this screw-thread is constant. This condition is indispensable in order that the duration of projection of the images may remain constant.

On the other hand, the frame carries a horizontal shaft 24 rotating at a constant speed, for instance, owing to a transmission by gears 25, 26, 27, 28 between this shaft and the shaft 2. The shaft 24 thus actuated serves to control on the one hand, the shutter 19, and on the other hand, the oscillation of the mirrors 16, 17. For that purpose, the mirror 16 is guided along two curved rails 29, and is moved periodically by a cam 34 which, at every revolution, acts upon a projection 16ª provided at the back of the mirror 16 and drives the latter against the action of a spring 35 until the said cam relieves the said projection 16ª. The spring then returns the mirror backward against stops 29ª. The cam 34 is fast on a shaft 36 which is coupled to the shaft 24 through pinions 37, 37ª, so as to revolve a turn for every projected image, and the displacement the same imparts to the mirror is substantially equal to the length of an image of the record, so that the mirror accompanies this image during the lapse of time it passes in the vertical light beam emitted by the source 15. During the passage of the opaque portion which follows the image, the mirror 16 is returned to the position of rest by the action of the spring 35. This oscillation of the mirror 16 causes to constantly pass through a fixed point B the light ray passing through the center of the image and reflected at A on the mirror 16, this point B being situated approximately on the vertical axis traced through the center of the pivot 30, the said axis passing approximately through the center of curvature of the rails 29.

The ray A B is horizontally reflected according to B C by the second mirror 17, which is mounted on a pivot 30, so as to be capable of oscillating about the said point B.

Both mirrors are connected together by a lever 31 rocking about an inclined shaft XX on a pivot 32, so that upon each circular movement of translation of the mirror 16, along the rails 29, the mirror 17 receives a movement of oscillation of reverse direction about the pivot 30. This latter movement has for effect to compensate the angular displacement received by the image reflected by the mirror 16 owing to the circular movement of the images carried by the record, so that the image projected on the screen remains perfectly fixed. The lever 31 is provided at its ends with guides 31a, 31b the walls of which are parallel to the axis XX. In the guide 31a slides the spherical head of the pivot 16b carried by the mirror 16. In the guide 31b slides a cylindrical rod 17a secured to the mirror 17 and perpendicular to the latter. To the center of the said mirror is secured an hemispherical cup 17b adjusted upon the spherical end of the pivot 30 and supported by two studs 17c engaged in two grooves 30a of the said end. When the mirror 16 moves along the rails 29, the pivot 16b causes the lever 31 to oscillate or rock about the pivot 30; the plane of the said mirror oscillates slightly due to the fact that the rod 17a is caused to remain parallel to the walls of the guide 31b and that these walls are slightly inclined as the middle plane of the lever 31 departs in one direction or in the other from the vertical middle plane passing through the axis XX and through the pivot 30; the grooves 30a have forms which are slightly curved and which correspond to the required oscillation of the mirror 17.

It is to be observed that the images carried by the disc 7 are practically of small size, for example 3 by 5 mm., so that the displacement of every image during its projection is also very small and almost rectilinear, and consequently the rocking or oscillating motions of the mirrors 16 and 17 are of a very small amplitude.

If the variation in the distance separating the objective from the screen is important relatively to this distance itself, it is to be feared that the projection does not remain in focus from the beginning to the end. This inconvenience can be avoided by using a movable screen moving with the optical system.

The half-nut 23 serving to drive the frame 12 is resiliently mounted under the latter so that it can be disengaged at will, for instance by pressing on a lever 33, when it is desired to rapidly move the frame, in particular for bringing it back to its initial position after each projection.

The phonographic audition is obtained at the same time as the projection by means of a reproducer provided with an acoustic horn of any type (not shown), and the stylus of which rests on the phonographic groove at the point corresponding to the image projected at the same instant.

Obviously, the apparatus can serve for the cinematographic projection alone as for the phonographic audition alone, and it can be very easily adapted for taking cinematographic images on a sensitized disc as well as for recording sounds.

It will be understood that many modifications can be made in the form of construction above described without departing from the scope of the invention. For instance, the system of mirrors 16, 17 can be replaced by any other suitable optical system; in particular, instead of the mirror 16 having a reciprocating movement of translation, use can be made of a circular series of mirrors uniformly inclined and rotating with a continuous movement in the same direction as the record.

The mirrors can also be replaced by total reflection prisms, or the source of light can receive a suitable movement, for instance a circular to-and-fro movement for following the images of the photogram during the time of each elementary projection, etc. On the other hand, instead of moving the optical system and leaving the record fixed, the whole of the optical system will be left fixed and the record will be progressively moved so that all of its images successively pass in front of the stationary source of light.

Claims:

1. In an apparatus for synchronous cinematographic projection and phonographic audition, adapted to use a record having two concentric portions, one of which is transparent and carries images arranged in a spiral and the other is opaque and carries a phonographic groove also in a spiral, the combination of a rotating horizontal plate adapted to receive the said record, a vertical shaft carrying the said plate, a second plate on the said vertical shaft, this second plate having a groove of spiral shape provided on one side and pitch of which corresponds to that of the cinematographic images of the said record, a roller adapted to enter the said groove, and to drive the groove plate and the plate adapted to receive the record, a driving shaft carrying the said roller and adapted to cause it to rotate and on which the said roller can longitudinally slide.

2. In an apparatus for synchronous cinematographic projection and phonographic audition, adapted to use a record having two concentric portions, one of which is transparent and carries images arranged in a spiral and the other is opaque and carries a phonographic groove also in a spiral, the combination of a horizontal rotating plate adapted to receive the said record, a vertical shaft carrying this horizontal plate, a second plate on the vertical shaft and adapted to rotate with and to longitudinally slide on this vertical shaft, this second plate having a groove in the shape of a spiral provided in the said plate on one side, and the pitch of which corresponds to that of the cinematographic images of the record, a roller adapted to enter the said groove having a spiral shape and to drive the groove plate, a spring on the said vertical shaft, and adapted to push the said spiral groove plate against the said roller, a driving shaft carrying the said roller, the latter being adapted to rotate with and to longitudinally slide on the said driving shaft, a spring on the said driving shaft and adapted to push the said roller from the center towards the periphery of the said spiral groove plate.

3. In an apparatus for synchronous cinematographic projection and phonographic audition, adapted to use a record having two concentric portions, one of which is transparent and carries images arranged in a spiral and the other is opaque and carries a phonographic groove also in a spiral, the combination of a horizontal rotating plate adapted to receive the said record, a vertical driving shaft carrying the said plate and adapted to drive it, a horizontal screw-threaded shaft, the pitch of the screw threads of which is equal to the pitch of the cinematographic images, means for the transmission of the rotation from the said vertical shaft to the said horizontal screw-threaded shaft, a half-nut adapted to fit on the screw-thread of the said horizontal shaft, an optical system of projection on the said half-nut and adapted to radially move relatively to the said horizontal plate.

In testimony whereof we have hereunto affixed our signatures.

PIERRE ARMAND DIGEON.
JACQUES DABERT BOULARAN,
also known as JACQUES DEVAL.